Jan. 8, 1963     K. GROSJEAN     3,072,336
HEAT EXCHANGER SYSTEM FOR TEMPERATURE CONTROL
Filed May 19, 1960     2 Sheets-Sheet 1

INVENTOR
KURT GROSJEAN
BY
Morgan, Finnegan, Durham & Pine
ATTORNEYS.

United States Patent Office 3,072,336
Patented Jan. 8, 1963

3,072,336
HEAT EXCHANGER SYSTEM FOR TEMPERATURE CONTROL
Kurt Grosjean, Zug, Switzerland, assignor to Landis & Gyr, A.G., Zug, Switzerland, a body corporate of Switzerland
Filed May 19, 1960, Ser. No. 30,290
Claims priority, application Switzerland June 5, 1959
2 Claims. (Cl. 236—1)

This invention relates to heat exchanger systems for room temperature control and more particularly to such systems having a plurality of coordinately controlled heat exchangers.

In order to influence the temperature of rooms, heat exchangers are known to which hot water is supplied from a central point for heating and cold water for cooling. Such heat exchangers may be provided with a thermostatic regulating valve which controls the quantity of the heating or cooling medium depending on the room temperature, and in which a liquid or vapor room-temperature sensor such as a liquid filled bulb is associated with the regulating valve and actuates a throttle valve through an expansion member such as an expansion tube or a diaphragm cell. The throttle valve works in opposite control directions for heating and cooling.

It is known to effect the reversal of the control direction automatically depending on the temperature of the medium. It is also known to effect the control of the throttle valve, not directly through the expansion member which is responsive to the room temperature, but rather through a hydraulic servo which is influenced by said expansion member and which can be provided in the regulating valve itself. An automatic regulating valve of this type may also be used, in conjunction with moisteners and ventilators, for air-conditioning.

In large rooms a plurality of heat exchangers set up at various points in the room are necessary to produce the necessary degree of heat or cold. It has now been found that it is practically impossible to set two thermostatic regulating valves to precisely the same operating temperature and to cause both regulating valves to close at the same moment. In practice, one regulating valve would always close before the other and the heat exchanger which was still switched on would work in opposition to the heat exchanger which was switched off. For example, if a plurality of heat exchangers with independent thermostatic regulating valves were jointly to heat a large room, then, as a result of switching off one heat exchanger, the supply of heat would be reduced and the temperature would rise more slowly or not at all. As a result, the other regulating valves would only be switched off much later or not at all and the other heat exchangers would continue to heat. Thus the temperature either could not drop or could only do so very slowly and the regulating valve which was switched off could not be switched on again or, would only be switched on after a long time. The result of this lack of coordinated operation would be that undesirably great local differences in the room temperature could occur although this was precisely what the provision of a plurality of heat exchangers was intended to avoid.

It is an object of the invention to overcome this disadvantage.

A further object of the invention is to provide a plurality of heat exchangers which are controlled to function in unison and which operate in a complementary and coordinated manner.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention relates to an arrangement for influencing the temperature of a room comprising a plurality of heat exchangers distributed in the room, using regulating valves with servo-control. The invention is characterized in that one heat exchanger is provided with a regulating valve which comprises a temperature sensor which controls the hydraulic servo of this exchanger for the control of its gate valve, while each of the other heat exchangers comprises a servo-valve which is provided with a pressure chamber for controlling the associated gate valve, and the pressure chambers of the servo-valves are connected through a control pressure line to the control pressure chamber of the regulating valve which is controlled by the room temperature.

The invention consists in the novel parts, constructions, arrangements, combinations and improvements herein show and described.

One embodiment of the invention will be explained in more detail by way of example with reference to the drawing of which:

Figure 1:
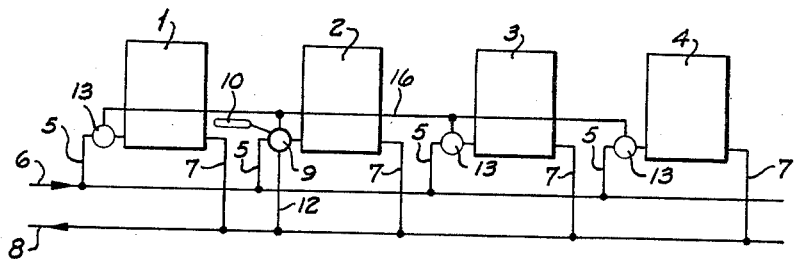
FIGURE 1 shows an installation comprising four heat exchangers arranged in a room.

In a room, as shown in FIGURE 1, there are four heat exchangers 1 to 4 each of which is connected through a connection pipe 5 to an input pipeline 6 and through a connection pipe 7 to a return pipeline 8 of a distributing system, not illustrated, with a central supply of hot or cold water. In the connecting pipe 5 of the heat exchanger 2 there is provided a regulating hydraulic servo valve 9 which regulates the heat exchanger 2 depending on a room-temperature sensor 10. The regulating valve 9 is preferably constructed in the form of a fully automatic regulating valve, that is to say it is equipped with a reversing device which works automatically for changing over from heating to cooling and vice versa. For the automatic changing over of the regulating valve 9 from heating to cooling and vice versa, it is necessary for the heating or cooling medium to be able to flow through the regulating valve 9 even when the gate valve 11 (shown in FIGURE 2), is closed. In order to achieve this flow a by-pass 12 connects the regulating valve 9 to the return pipeline 8. The other heat exchangers 1, 3 and 4 which are in the same room, each has in its connecting pipe 5 a servo-valve 13 which is dependent on the regulating valve 9 and has a valve head 15 which is controlled hydraulically through a pressure chamber 14 (see FIGURE 2). The pressure chambers 14 of the servo-valves 13 are connected through a control pressure line 16 to a high-pressure chamber 17 of the hydraulic servo regulating valve 9. By this means, the effect is obtained that all the servo-valves 13 work in synchronism with the regulating valve 9 and the heat exchangers 1 to 4 cannot adversely influence one another mutually.

Figure 2:
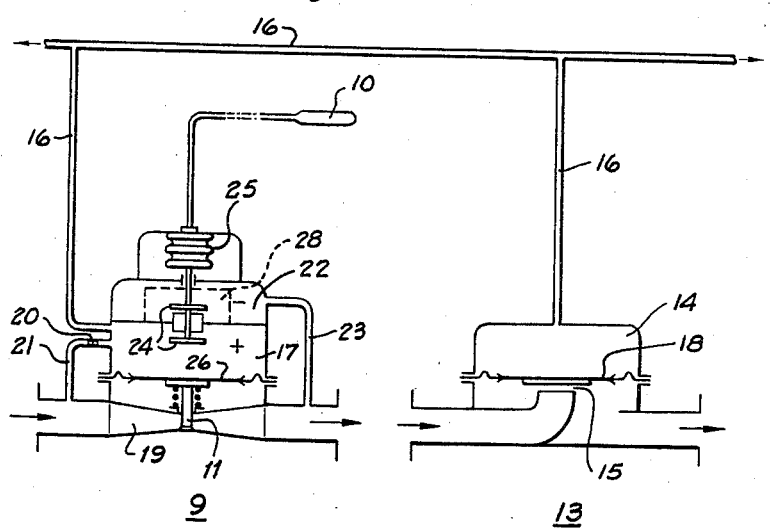
FIGURE 2 is a diagrammatic representation of one regulating valve and one servo-valve.

FIGURE 2 illustrates diagrammatically the regulating valve 9 and one of the servo-valves 13. Each servo-valve 13 comprises the above-mentioned pressure chamber 14 which is subject to control pressure and which is sealed to the same assignee as the assignee of the instant application 18. The pressure chamber 14 is connected through the control pressure line 16 to the high-pressure chamber 17 of the hydraulic servo regulating valve 9 so that a control pressure of equal magnitude prevails in all the pressure chambers 14 and all the diaphragms 18 work in synchronism. The control pressure necessary for this control is produced only in the regulating valve 9 by way of its hydraulic servo. For this purpose, the passage 19 through the valve is constructed, for example, in the form of a Venturi tube and the high-pressure chamber 17 is connected through a pipe 21 containing a throttle 20 to the inlet of the passage 19 and a low-pressure chamber 22 is connected through a pipe 23 to a lower pressure point in the passage 19. The two pressure chamber 17, 22 are in communication with one another through a control valve 24 which is subject to the direct action of an expansion tube 25 and which is controlled according to the room temperature detected by the room-temperature sensor 10. The construction of the control valve 24 in the form of a two-way valve is necessary in an automatic regulating valve because during heating and cooling it works in respective opposite directions. During heating, the upper valve seating comes into action and during cooling the lower valve seating comes into action, and a diaphragm 26 controls the gate valve 11 accordingly. The changeover from heating to cooling or vice versa is effected automatically by means of a temperature-responsive reversing device of known type symbolically illustrated at 28 and in FIGURE 2A, which is provided in the regulating valve 9. In this connection reference may be had to applicant's copending application Serial No. 862,581, now Patent No. 3,019,985, assigned to the same assignee as the assignee of the instant application for Heat Exchanger Valve and to Patent No. 2,936,121 for Thermostatic Valve for Automatic Heating or Cooling Regulation, issued to the assignee of the instant application. As pointed out in these disclosures the main valve of the heat exchanger opens when a temperature drop occurs during heating functions but must close when a temperature drop occurs during cooling functions.

Figure 2A:
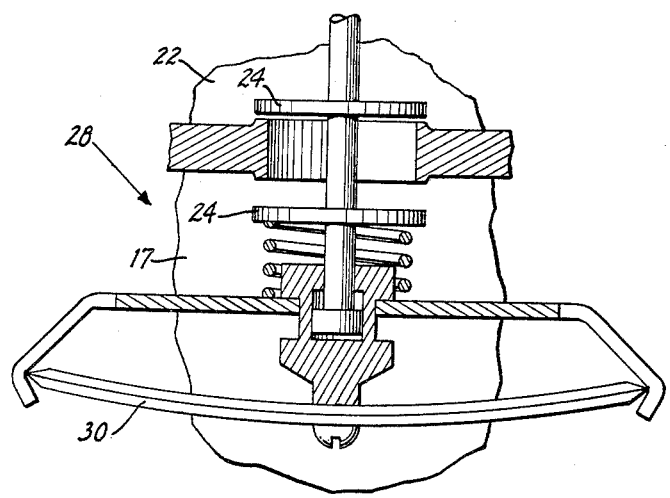
FIGURE 2A is a fragmentary detail view of a portion of the mechanism illustrated in FIGURES 1 and 2.

As noted in these disclosures a drop in temperature during heating functions must cause the main gate valve 11 to close. To accomplish this reversing action the means 28, FIGURES 2, 2A, are employed and in the patented disclosure comprise a bimetal element 30 which during heating functions places the upper valve 24 in operative position relative to the port and the lower valve 24 into this operative position during cooling functions. Thus, a drop in temperature during heating functions, when sensed by element 10, causes a contraction of bellows 25, thus pulling upper valve 24 away from its seat to open the same, in which event gate valve 11 opens to admit heating fluid. During cooling functions the lower valve 24 has control over the regulator and a drop in temperature causes a contraction of bellows 25 to close valve 24, thereby cutting off the admission of coolant. This reversing function which reverses the action of main gate valve 11 in accordance with whether heating or cooling is in process, is rendered automatic since the temperature sensitive element 30 of means 28 is responsive to the temperature of the heating or cooling medium and thus responds automatically whenever the medium is changed from the heating type to the cooling type, or vice versa.

In applicant's copending application, a generally similar result is obtained. Instead of a poppet valve and a single bimetal, however, that application discloses a rocker arm arrangement having two thermal elements and associated ball valves.

The regulating valve 9 and the servo-valves 13 may comprise identically constructed lower portions so that servo-valves, regulating valves or automatic regulating valves can be produced as required or a valve of one type can subsequently be converted to one of another type. By means of the arrangement described not only is a satisfactory regulation of the temperature of a room obtained with a plurality of heat exchangers but also only one of the heat exchanger valves is constructed in the form of a regulating valve which is actually controlled by the room temperature while all the other valves are simpler and cheaper servo-valves.

The invention in its broader aspects is not limited to the specific mechanisms shown and described but departures may be made therefrom within the scope of the accompanying claims without departing from the principles of the invention and without sacrificing its chief advantages.

What is claimed is:

1. A temperature control system for a room comprising a plurality of heat exchangers positioned in the room for conducting alternatively a single heat emitting and heat absorbing fluid medium therethrough for the automatic optional control over the heating and cooling of said room, a single separate valve means connected individually with each of said heat exchangers for controlling the passage of the fluid medium therethrough, regulating means operatively connected only to one of said heat exchangers and adapted to control only the one valve means of said one heat exchanger, said regulating means including a room temperature sensor and a hydraulic servo controlled by said temperature sensor, the hydraulic fluid of said servo being the heat emitting and heat absorbing fluid medium, said hydraulic servo including a high pressure chamber the pressure of which is responsive to said temperature sensor, a separate individual dependent servo valve for each of the remaining heat exchangers, each of said dependent servo valves having a pressure chamber for controlling the individual valve means of its respective heat exchanger, and a control pressure line connecting said high pressure chamber of said hydraulic servo to the pressure chamber of each dependent servo valve whereby upon the actuation of said hydraulic servo by said temperature sensor a corresponding actuation occurs in each of said dependent servo valves.

2. An arrangement as claimed in claim 1 in which said regulating means include temperature responsive automatic reversing means operatively connected with said hydraulic servo for reversing the response of said servo to said room temperature sensor when said fluid changes from said heat-emitting type to said heat-absorbing type.

References Cited in the file of this patent

UNITED STATES PATENTS

| Re. 10,768 | Johnson | Sept. 28, 1886 |
| 2,936,121 | Buchel et al. | May 10, 1960 |